United States Patent [19]

Inaba et al.

[11] Patent Number: 4,491,401

[45] Date of Patent: Jan. 1, 1985

[54] DIAPHRAGM DEVICE

[75] Inventors: Hiroyoshi Inaba; Akiyasu Sumi; Hidefumi Notagashira; Makoto Katsuma, all of Kanagawa; Hiroyasu Murakami, Tokyo; Akira Hiramatsu, Kanagawa, all of Japan

[73] Assignee: Canon Kabushiki Kaisha, Tokyo, Japan

[21] Appl. No.: 570,352

[22] Filed: Jan. 13, 1984

[30] Foreign Application Priority Data

Jan. 17, 1983 [JP] Japan .................................. 58-5592
Jan. 17, 1983 [JP] Japan .................................. 58-5593

[51] Int. Cl.³ ........................ G03B 9/06; G05D 25/00
[52] U.S. Cl. ................... 354/271.1; 354/453; 350/269

[58] Field of Search ............... 354/234.1, 235.1, 271.1, 354/453; 350/269, 449, 450; 355/34, 71; 358/228

[56] References Cited

U.S. PATENT DOCUMENTS 3,518,930  7/1970  Thieme et al. ...................... 354/453

*Primary Examiner*—William B. Perkey
*Attorney, Agent, or Firm*—Toren, McGeady and Stanger

[57] ABSTRACT

In a diaphragm device, a progressive oscillation wave is generated at a vibrating member by electrically energizing electrostriction members while a movable member which is arranged to actuate diaphragm blades is pressed into contact with the vibrating member by means of an urging member. The movable member is then frictionally driven by the oscillation wave to drive the diaphragm.

4 Claims, 10 Drawing Figures

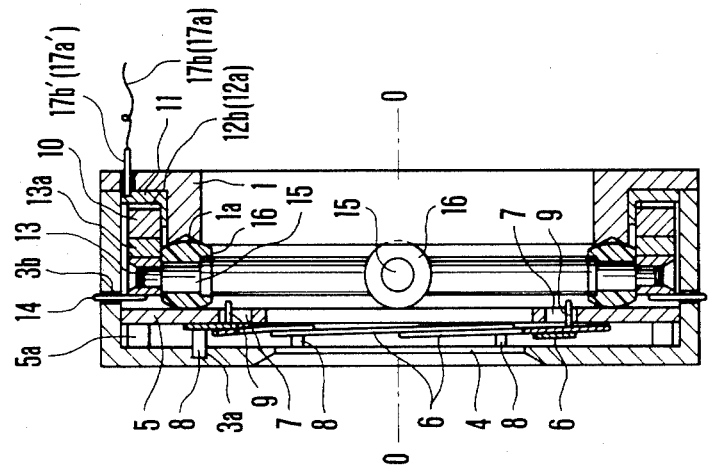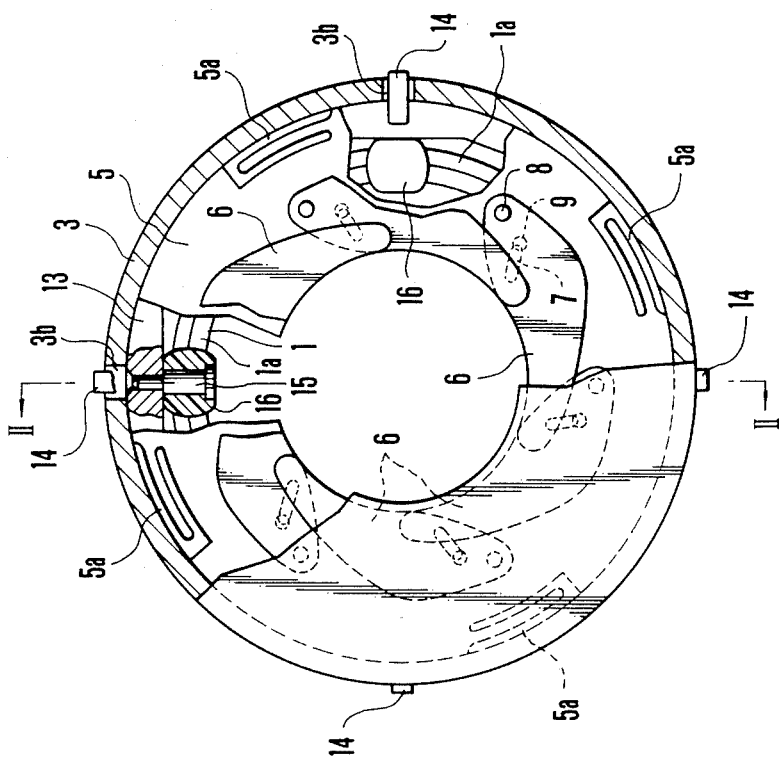

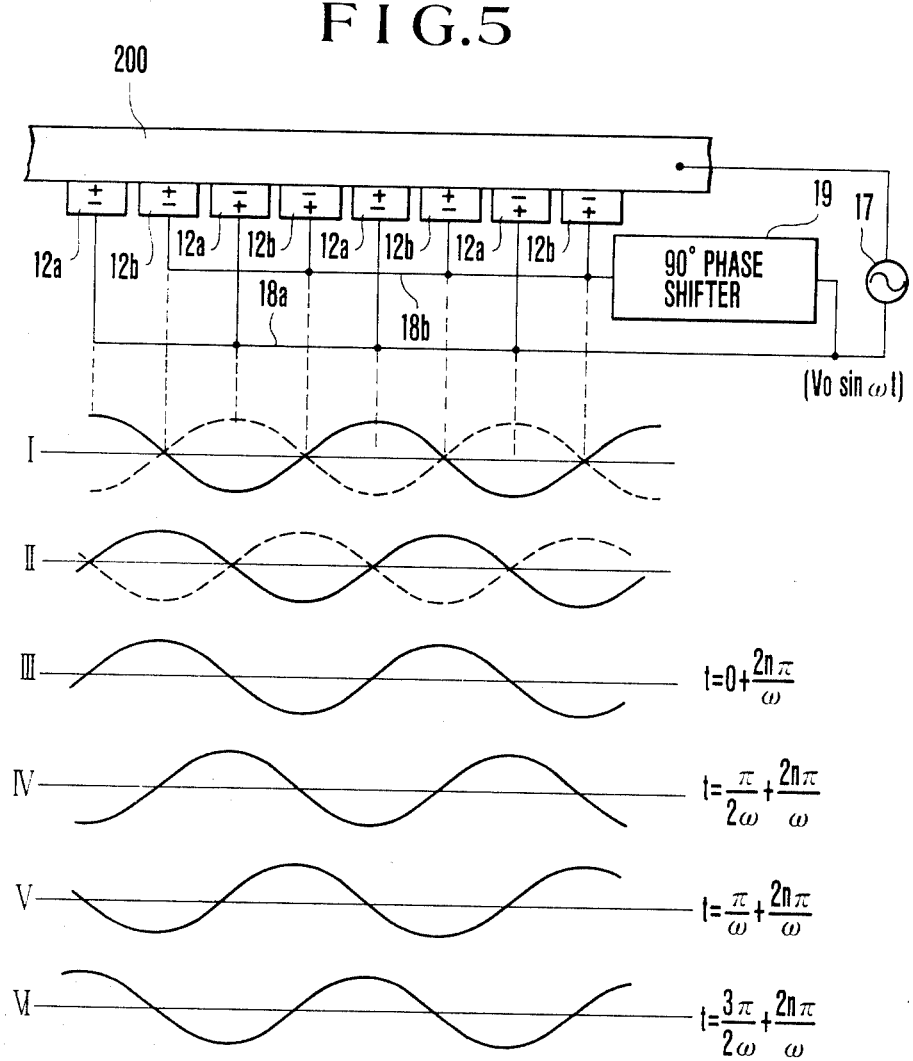

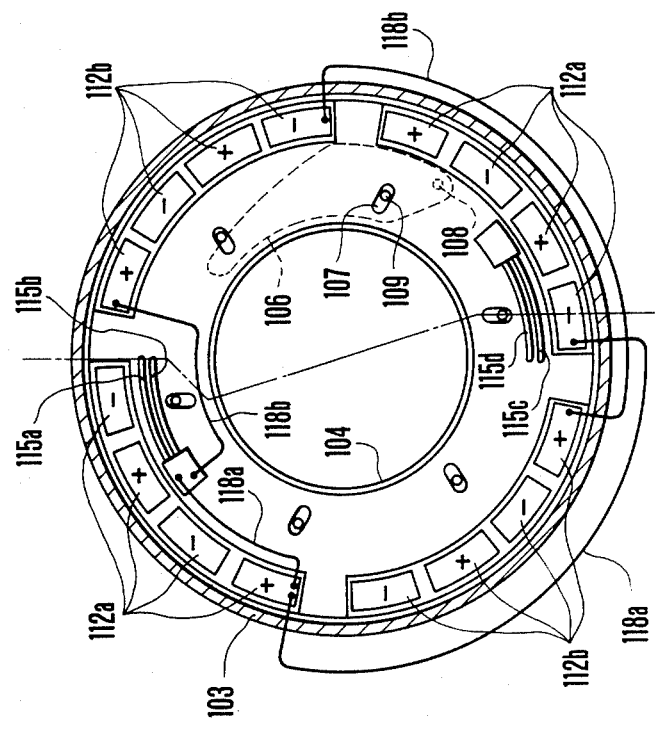
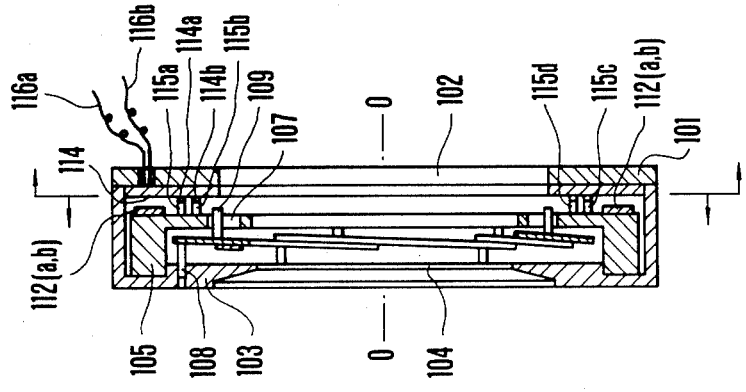

DIAPHRAGM DEVICE

BACKGROUND OF THE INVENTION

1. Field of the Invention

This invention relates to a diaphragm device to be used for a camera or other optical apparatus and more particularly to a diaphragm device arranged to have the aperture thereof electrically controlled with a motor or the like used as drive source.

2. Description of the Prior Art

Control methods for determining exposure conditions which are important for photographing include an aperture preference type and the shutter time preference type. In both of these types, a photographic computation system is arranged to perform electric control according to various factors which give exposure conditions including the brightness of an object to be photographed, the sensitivity of film, a shutter time value, an aperture value, etc.

The control systems of cameras are at present and will be in future arranged to perform such electric control as a prerequisite for an increased speed and a higher accuracy of the control. To keep up with such electric control arrangement on the side of the camera, phototaking lenses also have been either arranged to include an automatic focusing device or arranged in the form of a zoom lens to be driven by means of a motor. In the case of the photo-taking lens of the type having a motor included therein, a conventional discrete motor has been mounted on the photo-taking lens with the rotating shaft of the motor arranged to be linked to a movable member of the photo-taking lens via a gear train or the like. This arrangement of the prior art, therefore, has hardly permitted reduction in size of the lens.

Meanwhile, there has been proposed a diaphragm blade driving control system in which an electromagnetic driving device is included in a diaphragm device and is arranged to drive diaphragm blades by means of an electromagnetic force as disclosed, for example, in U.S. Pat. No. 3,687,042. In the diaphragm device of the prior art, however, the component parts of the diaphragm device and those of the electromagnetic driving device are arranged separately from each other and are not arranged in common. As a result, the diaphragm device as a whole becomes complex in structure and large in size.

Further, there has recently been proposed a method in which a diaphragm device is arranged to be operated by a hollow motor formed into a hollow shape similar to the shape of the diaphragm body. This method certainly permits reduction in the outer diameter of the lens. However, the connection part between the motor and the diaphragm body requires complex arrangement. Another shortcoming of the method lies either in poor responsivity of diaphragm blades due to insufficient performance of the motor or a high cost of the hollow motor.

SUMMARY OF THE INVENTION

It is therefore an object of the preset invention to provide a diaphragm device of a novel driving method wherein the above-stated shortcomings of the prior art devices are eliminated by driving the diaphragm by means of an oscillation wave motor mechanism which not only permits simplification of the structural arrangement of the diaphragm but also gives excellent responsivity.

The above and further objects and features of the invention will become apparent from the following detailed description of preferred embodiments thereof taken in conjunction with the accompanying drawings.

BRIEF DESCRIPTION OF THE DRAWINGS

FIG. 1 is a partially cutaway front view showing a diaphragm device as an embodiment of the invention.

FIG. 2 is a sectional view taken along the line II—II of FIG. 1.

FIG. 5 is an illustration showing the generation of a prograssive oscillation wave and a standing oscillation wave produced by the oscillation wave motor of FIG. 4.

FIG. 7 is a longitudinal sectional view showing a disphragm device as another embodiment of the present invention.

FIG. 8 is a front view of a patterned substrate of the device shown in FIG. 7.

DETAILED DESCRIPTION OF THE PREFERRED EMBODIMENTS

Figure 3:
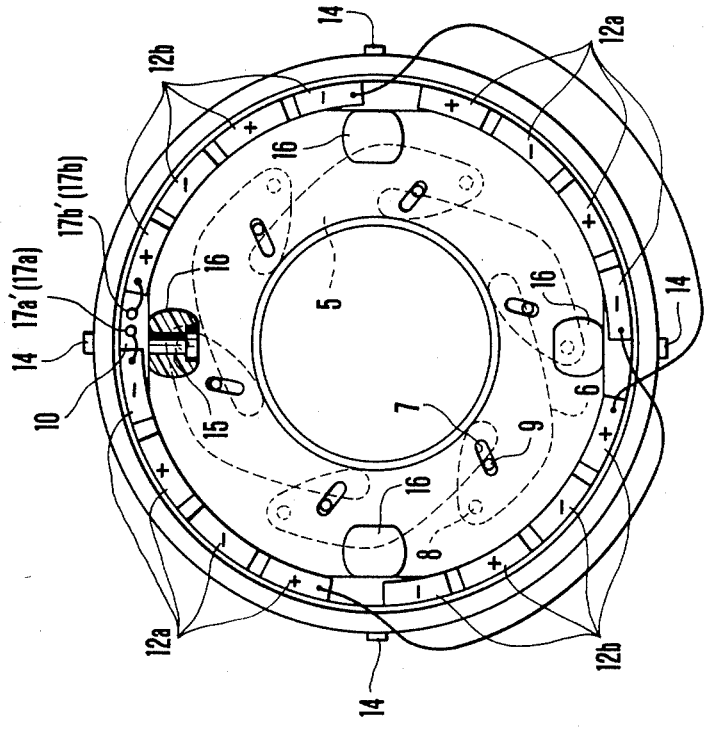
FIG. 3 is a rear view showing the same embodiment with the back plate of a blade casing and an oscillation absorbing member removed from the diaphragm device.

Referring to FIGS. 1, 2 and 3 which show a diaphragm device as an embodiment of the invention, the embodiment includes a blade casing back plate 1; an incidence aperture 2 formed in the back plate 1; a blade casing front plate 3; and a maximum diaphragm aperture determining aperture 4 formed in the front plate 4. The blade casing back plate 1 and the front plate 3 are joined in one unified body with a suitable space provided between them. A diaphragm blade actuating ring (windmill) 5 which is arranged as a first movable member is fittingly inserted inside the inner circumferential wall of the blade casing front plate 3. The ring 5 is arranged to be rotatable around an optical axis 0—0. A plurality of slots 7 are provided in the actuating ring 5 and are evenly spaced along the ring opening thereof. Between the above-stated actuating ring 5 and the reverse sioe of the blade casing front plate 3 are disposed a plurality of diaphragm blades 6 which are approximately evenly spaced in such a way as to encompass the opening of the diaphragm blade actuating ring 5. Each of the blades 6 is provided with a pin 8 which is disposed on the front base part of the blade and is inserted in a receiving hole 3a formed in the blade casing front plate 3. The blades 6 are thus arranged to be turnable on these pins 8. Meanwhile, a pin 9 is provided on the reverse side of each of the diaphragm blades 6 and is fittingly inserted in the corresponding slot 7 of the diaphragm blade actuating ring 5. Elastic tongues 5a are formed by cutting in at evenly spaced parts along the outer peripheral part of the diaphragm blade actuating ring 5. The free end of each of the elastic tongues 5a is arranged to be in contact with the reverse side of the blade casing front plate 3 in such a way as to constantly urge the diaphragm blade actuating ring 5 in a thrusting direction to move away from the blade casing front plate 3. When the diaphragm blade actuating ring 5 which is a first movable member is turned counterclockwise as viewed on FIG. 1, each of the diaphragm blades 6 is driven in the direction of narrowing the aperture of the diaphragm. With the aperture in a narrowed or stopped down state, if the actuating ring 5 is turned clockwise, each diaphragm blade 6 is driven to move in the direction of widening the aperture.

A vibration ring 10 (a stator) is stationarily provided as a vibrating member on the inner surface of the blade casing back plate 1 via an oscillation absorbing member 11 and concentrically with the aperture 2. To the reverse side of this ring 10 are stuck electrostriction elements 12a and 12b which are arranged along the ring 10 in accordance with an operating principle which will be described later herein.

A rotary ring 13 (a rotor) which is arranged as a second movable member is provided with a friction member 13a made of rubber or the like on the reverse side thereof. Leaf spring pieces 14 are inserted into the inside of the casing via evenly spaced notched holes 3b formed in several parts of the circumferential wall of the blade casing front plate 3. The tip of each of these leaf plate pieces 14 is in contact with the surface of the rotary ring 13 to thrust and urge the rotary ring 13 toward the vibration ring 10. This keeps the friction member 13a which is stuck to the rotary ring 13 in a state of being frictionally pressed against the surface of the vibration ring 10.

A plurality of approximately evenly spaced pin shafts 15 have their base parts secured by caulking or the like to the inner circumference of the rotary ring 13 with their tips directed in the radial directions of the ring 13. Each of the pin shafts 15 is provoded with a small elastic roller 16 which is rotatably carried by the pin shaft with some arrangement to prevent it from coming off the pin shaft. These small elastic rollers 16 are constantly pressed by an urging force of the above-stated leaf spring pieces 14 exerted in the sliding direction of the rotary ring 13 and are thus kept in pressed contact with a V-shaped ring groove track 1a formed along the periphery of the aperture 2 in the inner circumferential wall of the blade casing back plate 1. Meanwhile, the elastic tongue pieces 5a exert an urging force to constantly press the inner surface of the diaphragm blade actuating ring 5 against one side of each small elastic roller 16 opposite to the side on which it is pressed against the V-shaped groove track. Lead wires 17a and 17b are connecting power supply terminals 17a' and 17b' to a power supply control circuit (not shown). A lead wire 18a is arranged to connect the power supply terminal 17a' to the electrostriction elements 12a and, to interconnect these electrostriction the power supply terminal 17b' to the electrostriction elements 12b and to interconnect these elements 12b.

When frequency currents, such as alternating currents, are impressed on the electrostriction elements 12a and 12b via the lead wires 17a and 17b, the power supply terminals 17a' and 17b' and the lead wires 18a and 18b, phase shift distortions arise one after another at the electrostriction elements 12a and 12b which are arranged in a phase shifted state. As a result of that, there is produced a progressive oscillation wave on the surface of the vibrating ring 10. The energy of the progressive oscillation wave then acts on the contacting faces of the vibrating member 10 and the friction member 13a provided on the side of the rotary ring 13 to frictionally shift them relative to each other. Then, the rotary ring 13 which includes the friction member 13a as the second movable member is driven to turn around the optical axis 0—0. The direction of the progressive oscillation wave produced at the vibrating ring 10 is reversible by switching over the phases of the frequency voltages for the electrostriction elements 12a and 12b from one to the other. In other words, the turning direction of the rotary ring 13 is controllable to effect switch-over between forward and backward rotating directions.

With the rotary ring 13 rotatively driven, the small elastic rollers 16 attached to the ring 13 move rolling over the V-shaped ring groove track. As mentioned above, tnese small elastic rollers 16 are constantly in pressed contact with the diaphragm blade actuating ring 5 which is serving as the first movable member. Therefore, the actuating ring 5 is driven to turn according as the small elastic rollers 16 turn. In this instance, the rotation of the actuating ring 13 is driven at a speed which is the sum of a rotating speed caused by the vibrating ring 10 of the rotary ring 13 which is serving as the second movable member and the rotating speed of the small elastic rollers 16. In other words, the diaphragm blade actuating ring 13 rotates at a speed twice as high as the rotating speed of the rotary ring 10. Accordingly, this permits the diaphragm blades 6 to be opened and closed at a high speed.

Figure 4:
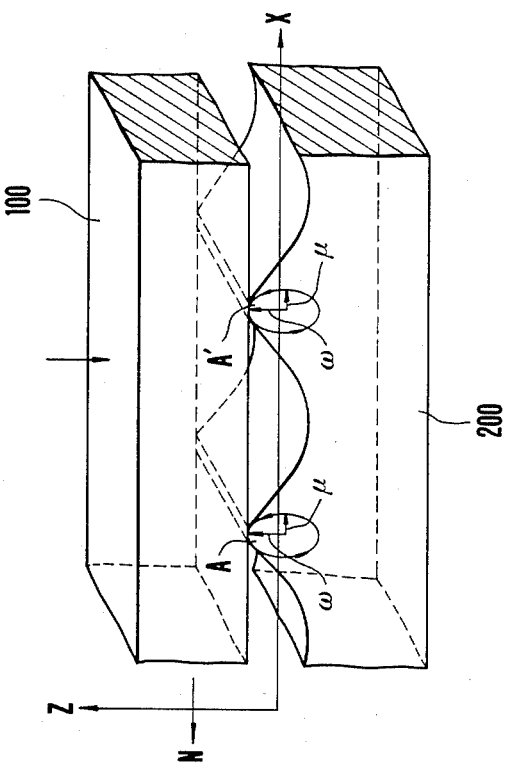
FIG. 4 shows the operating principle of an oscillation wave motor to be used for the diaphragm device shown in FIG. 1.

The principle of a driving operation for moving a body with the progressive oscillation wave generated by means of the above-stated electrostriction elements is as follows: Referring to FIG. 4, reference numerals 100 and 200 denote urging members or a moving body (a rotor) and a vibrator (a stator) which are brought into frictional contact with each other by their own weights. An axis X indicates the travelling direction of a surface wave which takes place on the surface of the vibrator 200 and an axis Z the normal direction of the surface wave.

When vibration is imparted by the electrostriction elements to the surface of the vibrator 200, an oscillation wave is generated and propagates over the surface of the vibrator 200. This oscillation wave is accompanied by a longitudinal wave and a transversal wave. The motion of the material point A of the wave comes to draw an elliptic locus. In respect to the material point A, the wave makes an elliptic motion of longitudinal amplitude u and transversal amplitude w. Assuming that the oscillating direction of the surface wave is $+x$, the elliptic motion is taking place in the counterclockwise direction. The surface wave has vertexes A and A' at every wave length. The vertex velocity V consists of an x component only and can be expressed as $V = 2\pi f u$, wherein f represents frequency. When the surface of the moving body 100 is brought into contact with the surface of the vibrator 200 with pressure, the surface of the moving body contacts solely with the vertexes A and A'. This causes the moving body 100 to be moved in the direction of arrow N by the frictional force of the vibrator 200.

The moving speed of the moving body 100 in the direction of arrow N is proportional to the oscillation frequency f. Further, because of frictional driving with the pressed contact, the moving speed is dependent not only on the longitudinal amplitude u but also on the transversal amplitude w. In other words, the speed of the moving body 100 is proportional to the size of the elliptical motion and becomes faster according as the size of the elliptical motion increases. Accordingly, the speed of the moving body is proportional to the voltage applied to the electrostriction elements.

FIG. 5 shows the interrelation among the vibrator 200; the arrangement of the electrostriction elements, such as PzT, etc., which are secured by means of an adhesive or the like to the vibrator for the purpose of bivrating the vibrator; and the generating condition of standing and progressive oscillation waves.

The electrostriction elements 12a and 12b are stuck to the reverse side of the vibrator 200 at such spacing intervals that most efficiently give an elastic wave from the resonance frequency of the vibrator 200. More specifically stated, the elements 12a and 12b are arranged in such a manner that the vibrator 200 resonates when the elements 12a or 12b are solely driven, that is, in such a way as to permit the presence of a standing wave. A standing wave length due to the elements 12a is arranged to be equal to a standing wave length due to the elements 12b. These standing waves are arranged to be differing from each other by 90° in phase. In other words, they are arranged in physical positions at a pitch of $\lambda$(wave length)/4.

For the sake of illustration, the electrostriction elements 12a and 12b are shown in FIG. 5 as being arranged alternately unlike the illustration of FIG. 3 in which they are arranged in groups. However, in both cases, the physical positional relations between one element and another and between one group and another satisfy the relationship described above and therefore these different arrangements can be considered equivalent to each other.

A reference numeral 17 denotes a power source (power supply circuit) for driving this motor. The power supply circuit 17 supplies a voltage $V = V_o \sin\omega t$ to the electrostriction elements 12a and 12b. During a driving operation, the voltage $V = V_o \sin\omega t$ is supplied to the elements 12a via the lead wire 18a while a voltage $V = V_o \sin(\omega t \pm \pi/2)$ is arranged to be supplied to the elements 12b via a 90° phase shifter 19 and the lead wire 18b. The + or − of the phase shift is arranged to be switched over according to the moving direction of the moving body 100. In other words, the moving direction of the moving body 100 varies according to whether the phase shifter 19 shifts the phase or −90°.

In FIG. 5, a graph I shows a vibrating state of the vibrator 200 resulting from a standing wave produced when the AC voltage $V = V_o \sin\omega t$ is impressed solely on the electrostriction elements 12a. A graph II shows a vibrating state of the vibrator 200 resulting from a standing wave produced when the AC voltage of $V = V_o \sin(\omega t - \pi/2)$ is impressed solely on the electrostriction elements 12b.

Other graphs III, IV, V and VI respectively show vibrating states (or progressive oscillation wave generating states) of the vibrator 200 resulting from impression of the above-stated voltages $V_o \sin\omega t$ and $V = V_o \sin(\omega t - \pi/2)$ simultaneously on the elements 12a and 12b. Referring to these graphs, $t = 2n\pi/\omega$ in the case of the graph III; $t = \pi/2\omega + 2n\pi/\omega$ in the case of the graph IV; $t = \pi/\omega + 2n\pi/\omega$ in the case of the graph V; $t = 3\pi/2\omega + 2n\pi/\omega$ in the case of the graph VI. The progressive oscillation wave travels in the rightward direction. However, an arbitrary material point A of the driving face of the vibrator 200 (see FIG. 4) makes a counterclockwise elliptic motion. Accordingly, the moving body 100 which is in pressed contact with the driving face of the vibrator 200 moves leftward.

Under the standing wave conditions shown in the Graphs I and II, there is produced only a transversal vibration at any material point other than a node as represented by the vertical motion shown in FIG. 4. The friction faces of the vibrator 200 and the moving body 100 which is in pressed contact with the vibrator 200 are not in a static frictional state but is in dynamic frictional state and thus have a reduced contact area. Accordingly, in moving the moving body 100 by means of an external force, it is movable with a smaller force when the standing wave is allowed to be generated than when there is no standing wave.

In the embodiment shown in FIGS. 1-3, the vibrating ring 10 corresponds to the vibrator 200 mentioned in the above description of the operating principle while the rotary ring 13 which serves as the second moving member and is provided with the friction member 13a corresponds to the moving body 100.

Further, in the operating principle described above, it is also possible to arrange the electrostriction elements on the side of the moving body 100 in such a way as to make the moving body 100 serve combined functions as vibrator and moving body while the vibrator 200 is arranged as a mere stationary member. In such modification, the moving body 100 is also capable of moving in the same manner. Therefore, the embodiment shown in FIGS. 1-3 also may be modified as follows: The electrostriction elements 12a and 12b may be arranged on the side of the rotary ring 13 to make the ring 13 serve the combined functions as vibrator and rotary ring while the vibrating ring 10 may be arranged as a mere fixed ring member.

In FIG. 3, the electrostriction elements 12a and 12b are arranged in groups. This arrangement may be changed to have these elements individually arranged with partial polarization treatment applied to each of them.

In accordance with this invention, the movable member for operating the diaphragm blades is arranged to be driven by the oscillation wave motor mechanism which uses the electrostriction elements as mentioned in the foregoing. Compared with the conventional arrangement in which a motor using an electromagnetic force is employed as drive source, the invented arrangement is simple in structural arrangement; requires no winding; is efficient; dispenses with reduction mechanism; and thus permits simplification of the structural arrangement of the whole diaphragm device and reduction in size thereof. The diaphragm device according to the invention has a high degree of responsivity, because the driving force of the oscillation wave motor mechanism is arranged to be transmitted to the diaphragm blades via a speed enhancing mechanism. The invention thus permits mass production of a compact, high efficiency electric control type diaphragm device at a low cost, so that the object of the invention mentioned in the foregoing can be attained.

Figure 6:
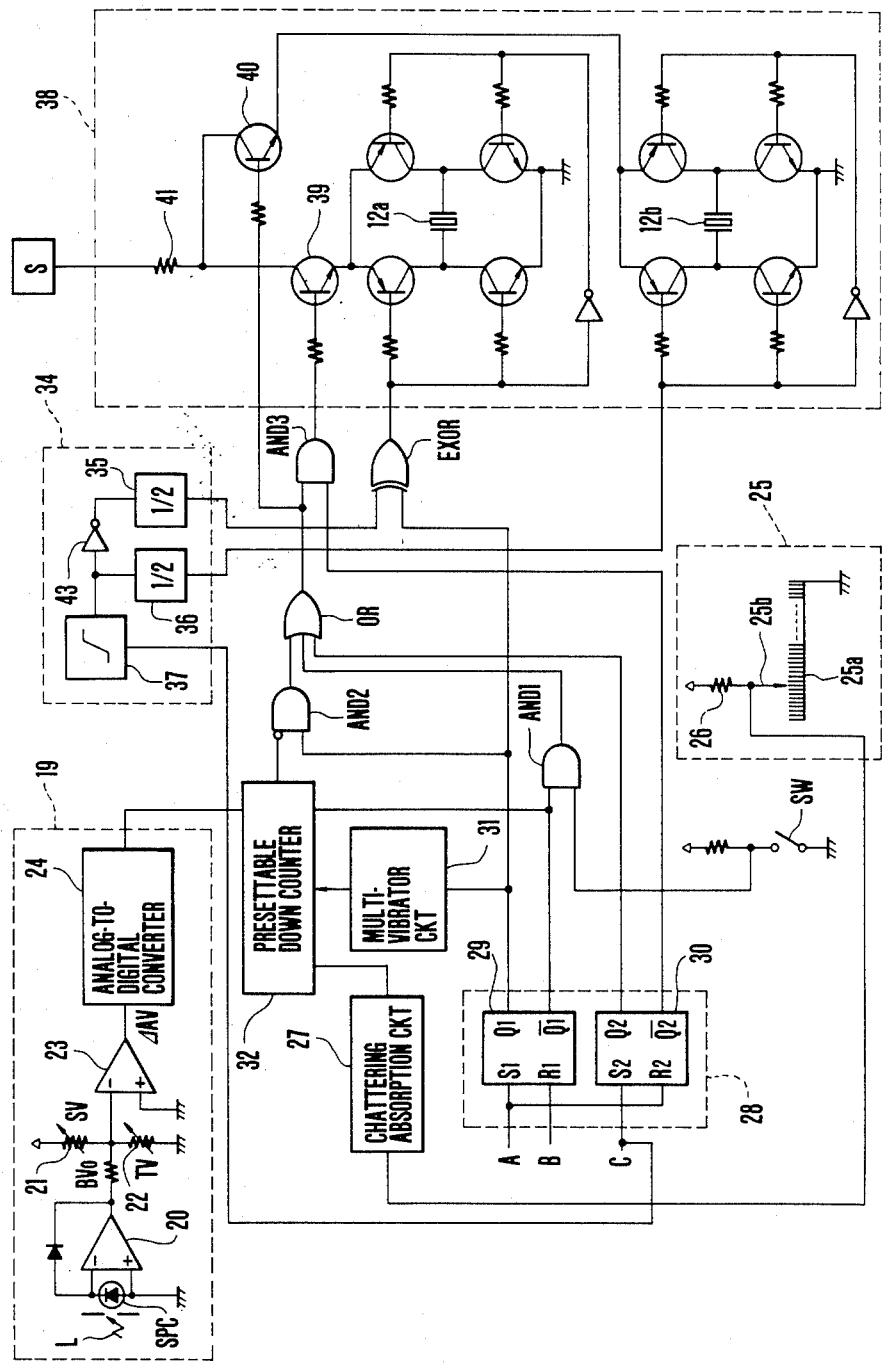
FIG. 6 is a circuit diagram showing the control circuit of the device of FIG. 1.
Figure 10:
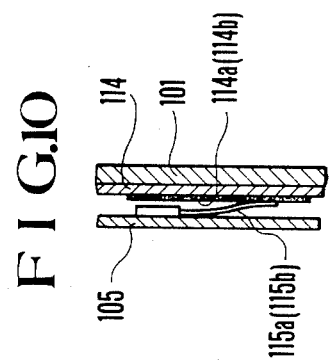
FIG. 10 is a longitudinal sectional view showing a leaf spring part of the diaphragm device shown in FIG. 7.
Figure 9:
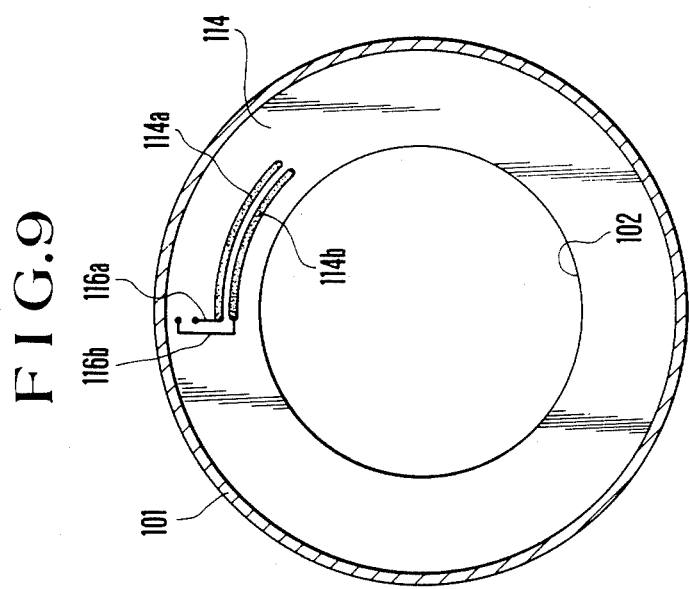
FIG. 9 is a rear view showing the diaphragm blade actuating ring of the device shown in FIG. 7.

FIG. 6 shows an example of control circuit arrangement for forward and backward driving operation on the above-stated diaphragm-driving oscillation-wave motor in relation to the light measuring operation of a camera of the TTL full-open aperture light measurement type. In this example, an operation on a camera release button is divided into two steps of stroke. In the first stroke of the operation, the rotating body 5 of the oscillation wave moror is set into the standing wave oscillating state while the light measuring computation of the camera is performed. In the second stroke of operation, the rotating body is driven with the progressive oscillation wave while a photographing sequence of operation of the camera begins. A DC power source is employed as power source. The DC voltage of the power source is converted into a frequency voltage. The voltage thus obtained is then impressed on the electrostriction elements for performing a motor driving operation.

The circuit arrangement includes a light measuring circuit 19 which consists of a light sensitive element SPC, an operational amplifier 20, etc. and is arranged to convert the brightness of an object to be photographed into an electrical signal. The light measuring circuit 19 produces the electrical signal corresponding to the brightness information (a value Bv) from its output terminal. Variable resistors 21 and 22 form photographing information input means and are arranged to receive, from the outside of a photographing apparatus (not shown), settable film sensitivity information (a value Sv) and set exposure information (such as a shutter time value Tv). An amplifier 23 is arranged to perform exposure computation. Assuming that the aperture value to be controlled is Av and a full-open or maximum aperture value is Avo, an aperture value ΔAv to be obtained by stopping down the diaphragm aperture from its full open position can be expressed as follows:

$$\Delta Av = Av - Avo \quad (1)$$

Assuming that the brightness of the object is Bv, the quantity of light incident upon the light sensitive element SPC for measuring light L with the full-open aperture, that is, the output value Bvo of the light sensitive element SPC can be expressed as follows:

$$Bvo = Bv - Avo \quad (2)$$

Then, the APEX computation formula Bv+Sv=Av+Tv can be changed by using the Formulas (1) and (2) above as shown below:

$$(Bv - Avo) + Sv - Tv + Av - Avo = \Delta Av$$

The Above value thus becomes the output value of the operational amplifier 23. The number of steps by which the automatic diaphragm unit is to be stopped down can be set by this output value ΔAv. A reference numeral 24 denotes an analog-to-digital converter. The converter 24 converts a signal representative of the number of aperture stopping-down steps computed by the amplifier 23 into a digital value. A numeral 25 denotes a pulse generating circuit whih is formed by a sliding piece 25b sliding over an electrode 25a, a resistor 26, etc. The sliding piece 25a is arranged to turn together with the diaphragm blade actuating ring 5 and to produce a pulse every time it slides over the electrode 25a which is formed into a comb-like shape. A chattering absorption circut 27 is arranged to remove a chattering component from a signal produced from the electrode 25a which is connected to the power source via the resistor 26.

A circuit 28 is arranged to control a stopping-down action in accordance with a diaphragm operation signal. The circuit 28 includes a flip-flop circuit 30 which is arranged to be set by a power source signal C produced in response to the first stroke of a shutter release operation. Then, the flip-flop circuit 30 produces a signal Q2. The flip-flop circuit 30 is arranged to be reset by an aperture control start signal A and then to produce a signal $\overline{Q2}$. Further included in the circuit 28 is another flip-flop circuit 29. The flip-flop 29 is set by the aperture control start signal A produced in response to the second stroke of the shutter release operation and is arranged to produce a signal Q1 when it is thus set. The flip-flop 29 is reset by an exposure control completion signal B and is arranged to produce a signal $\overline{Q1}$ when it is reset. A monostable multivibrator circuit 31 is arranged to produce an extremely short single pulse in response to the output Q1 of the flip-flop circuit 29. A presettable down counter 32 is arranged to be reset by the output $\overline{Q1}$ of the flip-flop circuit 29. The output datum of the analog-to-digital converter 24 is preset by the output signal of a monostable multivibrator 31 in response to the output Q1 of the flip-flop circuit 29. A datum preset on the basis of the output of the chattering absorption circuit 27 is down counted. Upon completion of the count, the counter 32 produces a carry output.

A switch SW is arranged to be closed when the diaphragm aperture is in a full-open state and to be opend when the diaphragm aperture is stopped down even to a slight extent. A numeral 34 denotes a pulse generating circuit. The output of an oscillator 37 is supplied to a frequency divider 36 and to another frequency divider 35 via a NOT circuit 43. The pulse generating circuit 34 operates in response to the power source signal C to produce pulse waves of phases differing 90° from each other.

A driver circuit 38 is arranged to drive the electrostriction elements 12a and 12b. The driver circuit 38 consists of transistors, resistors, NOT circuits, etc. which form a push-pull circut. Switching transistors 39 and 40 are arranged to switch on and off power supply S (DC) for impressing a voltage on the elements 12a and 12b via the push-pull circuit.

The circuit arrangement further includes AND circuits AND1, AND2 and AND3; an OR circuit OR; and an exclusive OR circuit EXOR. They are known circuits.

In carrying out a photographing operation with the camera which is arranged as described above, power supply is first switched on in response to the first stroke of a shutter release operation. With power supply thus effected, light measuring, pulse generating and other circuits begin to operate.

In the circuit 19, the operational amplifier 23 computes and produces the number of aperture stopping down steps ΔAv on the basis of the brightness of the object and photographing information values Tv and Sv. The output ΔAv thus obtained is converted to a digital value by the converter 24.

The signal C produced by the first stroke of the shutter release operation resets the circuit 30. The output terminal Q2 of the circuit 30 produces a high level (H) signal to cause the output level of the OR circuit OR to become a high level (hereinafter will be called H for short). This H output brings the transistor 40 into a closed state. Meanwhile, the output terminal $\overline{Q2}$ produces a low level (L) signal (hereinafter a low level will be called L for short). The L signal causes the AND circuit AND3 to produce an L signal to bring the transistor 39 into an open state. Accordingly, a voltage is impressed on the electrostriction elements 12b while no voltage is impressed on the electrostriction elements 12a.

With the signal C produced, the pulse generating circuit 34 operates to cause the frequency divider 36 to produce a pulse output. The pulse output is then supplied to the push-pull circuit of the electrostriction elements 12b. The elements 12b vibrate. However, the elements 12a do not vibrate as no voltage is impressed on them as mentioned above. Accordingly, the vibrating ring 10 has only the standing wave produced there and a vibrating energy is stored there.

A second stroke of the shutter release operation produces an aperture control start signal A. This brings the circuit 30 into a reset state. The output Q2 then becomes an L signal and the output $\overline{Q2}$ an H signal. The flip-flop circuit 29 is brought into a set state. The output Q1 becomes an H signal and the output $\overline{Q1}$ an L signal. The counter 32 which receives the output $\overline{Q1}$ at its reset terminal is released from a reset state. At the same time, the output Q1 causes the multivibrator circuit 31 to produce a signal. The abovestated digital value of the converter 24 is preset by a preset datum input on the basis of the signal produced from the multi-vibrator 31. A signal is supplied from the frequency divider 35 to the OR circuit EXOR. When the output Q1 is supplied to the OR circuit EXOR, a pulse which advances phase by 90° relative to the frequency divider 36 is produced there. Meanwhile, the output Q1 is supplied also to the AND circuit AND2 to cause the AND circuit AND2 to produce an H signal. The output of the OR circuit OR then becomes an H signal. The H signal from the OR circuit OR is supplied to the AND circuit AND3 and also keeps the transistor 40 in a closed state. Since the output Q2 which is another input to the AND circuit AND3 is an H signal, the AND circuit AND3 produces an H output to bring the transistor 39 into a closed state.

Accordingly, driving frequency voltages differing 90° in phase from each other are supplied to the electrostriction elements 12a and 12b to cause them to vibrate respectively. As a result, a progressive oscillation wave is produced at the vibrating ring 10. This rotatively drives the rotary ring 13. The diaphragm blade actuating ring 5 tnen turns and causes the blades 6 to move in the direction of stopping down the aperture. The turn of the diaphragm blade actuating ring 5 brings the switch SW into an open state. It further causes the comb switch 25a and 25b to perform a repetitive on-and-off operation. Then, a number of pulses corresponding to the rotation angle of the diaphragm blade actuating ring 5 are supplied via the chattering absorption circuit 27 to the counter 32. The counter 32 then counts down these pulses one after another down to the preset number of aperture control steps. When the result of the count becomes zero, the carry output terminal of the counter 32 produces an H signal. This causes the output of the AND circuit AND2 to become an L signal, which is then supplied to the OR circuit OR. Since the inputs of other terminals of the OR circuit are also at L, the output level of the OR circuit OR becomes L. The output level of the AND circuit AND3 also becomes L. Therefore, both the transistors 39 and 40 come to open and power supply comes to a stop.

As a result, the diaphragm blade actuating ring 5 comes to a stop while the diaphragm blades 6 are stopped down to an optimum aperture. In this instance, the aperture value controlled by the diaphragm blades 6 becomes a value obtained by stopping down the aperture from the maximum aperture value Avo to the extent of the number of aperture control steps ΔAv. This aperture value can be expressed as follows:

$$Avo + \Delta Av = Av$$

Following that, a shutter is operated to expose a film surface to light. Upon completion of the exposure, the circuit 29 is reset by an exposure control completion signal B. The output Q1 becomes an L signal. Another output $\overline{Q1}$ of the circuit 29 becomes an H signal and is supplied to the AND circuit AND1. Since the switch SW is in an open state, the output of the AND circuit AND1 becomes an H signal and is supplied to the OR circuit OR. This causes the output of the OR circuit OR to become H. The H output of the OR circuit OR is supplied to the AND circuit AND3 and also causes the transistor 40 to close. Since the level of the output $\overline{Q2}$ of the circuit 30 is at H, the H output together with the above-stated H output of the OR circuit OR causes the output level of the AND circuit AND3 to become H. The H output of the AND circuit AND3 causes the transistor 39 also to close. As a result, power supply is effected to both of the electrostriction elements 12a and 12b. Since the output Q1 of the circuit 29 is at L, the output of the frequency divider 35 is inverted by the exclusive OR circuit EXOR. Therefore, the output of the frequency divider 35 becomes a signal the phase of which is delayed by 90° relative to the pulse produced from the other frequency divider 36. Therefore, a progressive oscillation wave produced by the vibration of the electrostriction elements 12a and 12b this time travels in the direction which is reverse to that of the progressive oscillation wave mentioned in the foregoing. This causes the rotating ring 10 and the diaphragm actuating ring 5 to turn in the reverse direction. Therefore, the aperture is again opend. When the aperture reaches a full-open position, the switch SW is closed and an L signal is supplied to the AND circuit AND1. Then, all the inputs of the OR circuit OR become L signals to cause the OR circuit to produce an L output. The L output of the OR circuit OR brings the transistors 39 and 40 into open states to cut off power supply to the elements 12a and 12b and the diaphragm blades 6 stop from moving at the full-open position of the aperture.

Another embodiment of the invention is arranged as shown in FIGS. 7-10. Referring to these drawings, the embodiment includes a blade casing back plate 101; and incidence aperture 102 formed in the back plate 101; a blade casing front plate 103; and an opening 104 which is formed in the front plate 104 and is arranged to determine a full-open or maximum aperture. The back plate 101 and the front plate 103 are arranged in one unified body with a suitable space left between them. In the space between the back and front plates 101 and 103 are disposed a diaphragm blade actuating ring (windmill) and a plurality of diaphragm blades.

The actuating ring 105 is provided with a plurality of slots 107 which are formed in the ring and are approximately evenly spaced along the ring of the actuating ring 105. The diaphragm blades 106 are approximately evenly spaced to encompass the aperture 102 of the blade actuating ring 105. A pin (or a dowel) 108 is provided on the front side of each of the blades at the base part thereof and is fittingly inserted in a receiving hole provided in the blade casing front plate 103. These blades 106 are turnable on the pins 108. Each of the blades 106 is further provided with a pin 109 which is disposed on the reverse side thereof. The fore end part of each of the pins 109 is fittingly inserted in each corresponding slot 107 of the diaphragm blade actuating ring 105. A patterned substrate 114 is secured to the surface of the blade casing back plate 101. On the free surface of the substrate 114 are formed arcuate power supply conductive patterns 114a and 114b which are arranged around an optical axis 0—0. Long narrow spring pieces 115a and 115b are interposed in between the patterned substrate 114 and the diaphragm blade actuating ring 105 and are arranged to serve as elastic urging members. One end of each of the spring pieces 115a and 115b is secured to the reverse side of the actuating ring 105 while the free end of it is allowed to be in pushing contact with the surface of the patterned substrate 114. Another pair of long narrow spring pieces 115c and 115d are disposed on the actuating ring 105 on the opposite side of the ring 105 approximate 180° away from the first pair of spring pieces 115a and 115b. These spring pieces 115a–115d keep the actuating ring 105 in frictional pressed contact with the reverse side of the blade casing front plate 103. In this specific embodiment, the spring pieces 115a and 115b are made of a conductive material and have their free ends arranged to come into contact with the above-stated arcuate power supply conductive patterns 114a and 114b of the patterned substrate 114. This arrangement permits the spring pieces 115a and 115b to perform additional functions as sliding electric contacts for power supply to electrostriction elements 112a and 112b which will be described later herein. Lead wires 116a and 116b are arranged to connect the conductive patterns 114a and 114b of the patterned substrate 114 to a power supply circuit for the electrostriction elements 112a and 112b.

The above-stated electrostriction elements 112a and 112b are stuck to the reverse side of the diaphragm blade actuating ring 105 and are arranged in a ring shape according to an operating principle which has been described in the foregoing. A lead wire 118a is arranged to connect the electrostriction elements 112a to the spring piece 115a which serves as electric contact for power supply and to interconnect one element 112a to another element 112a. Another lead wire 118b is arranged to connect the electrostriction elements 112b to the other spring piece 115b which is also arranged to serve as electric contact for power supply and to interconnect one element 112b to another element 112b.

When a frequency voltage such as an AC voltage is impressed from the power supply circuit via these lead wires 116a and 116b onto the conductive patterns 114a and 114b of the patterned substrate 114, power supply (impression of frequency voltages such as AC voltages) is effected to the elements 112a and 112b via the spring pieces 115a and 115b which serve as electric contacts and the lead wires 118a and 118b. The power supply causes the elements 112a and 112b to make vibrating motions. As a result of these vibrating motions of the elements 112a and 112b, the diaphragm blade actuating ring 105 to which these elements are attached resonates to bring forth a progressive oscillation wave on the surface of the actuating ring 105. Since this ring 105 is constantly kept by the spring pieces 115a–115b in frictional pressed contact with the reverse side of the blade casing front plate 103 which is a fixed member, the energy of the progressive oscillation wave acts as a force to frictionally move the ring 105 and the front plate 103 relative to each other. Then, this force drives the diaphragm blade actuating ring 105 which is a movable member to turn. The direction of the progressive oscillation wave is shiftable from a forward direction to a backward direction and vice versa by switching over the phases of the frequency voltages for the electrostriction elements 112a and 112b.

Therefore, the diaphragm blades are driven either in the direction of widening the aperture or in the direction of narrowing the aperture according to the forward or backward motion of the actuating ring 105 caused by the energy of the progressive oscillation wave. Further, in a possible modification, the blade casing front plate 103 which is a fixed member may be arranged to serve as a vibrator with the electrostriction elements 112a and 112b disposed on the side of the plate 103. This arrangement likewise causes the actuating ring 105 which is pressed against the plate 103 to be driven to turn.

The principle of the driving operation of the oscillation wave motor by the progressive oscillation wave obtained from the use of the above-stated electrostriction elements has already been described with reference to FIGS. 4 and 5 in the foregoing and thus requires no further description here. Further, the control circuit arrangement of this oscillation wave motor for driving the diaphragm blades also has been already described with reference to FIG. 6 in the foregoing.

Further, the groups of the electrostriction elements 112a and 112b may be individually arranged, instead of the grouped arrangement, with each individual element partially subjected to a polarizing treatment as applicable.

With a camera arranged in the manner as described in the foregoing, a photographing operation is performed as follows: When the first stroke of a shutter releasing operation is performed, power supply is switched on. Then, a light measuring circuit, the pulse generating circuit, etc. begin to operate. In the circuit 19, the operational amplifier 23 computes and produces the number of aperture control (stopping-down) steps $\Delta Av$ on the basis of the brightness of the object and photographing information values Tv and Sv. The value $\Delta Av$ thus obtained is converted into a digital value by the converter 24. The circuit 30 is reset by the signal C which is produced by the first stroke of the shutter release operation. An H signal produced from the output terminal Q2 of the circuit 30 causes the output level of the OR circuit OR to become H. The H output of the OR circuit brings the transistor 40 into a closed state. Meanwhile, the output terminal $\overline{Q2}$ of the circuit 30 produces an L signal. The L signal causes the AND circuit AND3 to produce an L signal to bring the transistor 39 into an open state. Accordingly, a voltage is impressed on the electrostriction elements 12b while no voltage is impressed on the electrostriction elements 12a.

With the pulse generating circuit 34 caused to operate by the signal C, the frequency divider 36 produces a pulse output. The pulse output is then supplied to the push-pull circuit of the electrostriction elements 12b. The elements 12b thus come to vibrate. However, the elements 12a do not vibrate as no voltage is impressed on them as mentioned above. Accordingly, the diaphragm blade actuating ring 105 which is a rotatable body does not turn and a vibrating energy is stored there as it is only the standing wave that is produced there in this instance.

A second stroke of the shutter release operation produces an aperture control start signal A. This signal A then brings the circuit 30 into a reset state. The output Q2 of the circuit 30 then becomes an L signal and the output $\overline{Q2}$ thereof an H signal. The circuit 29 is brought into a set state. The output Q1 of the circuit 29 becomes an H signal and the output $\overline{Q1}$ thereof an L signal. The counter 32 which receives the output $\overline{Q1}$ at its reset terminal is released from a reset state. At the same time, the output Q1 causes the multibivrator circuit 31 to produce a signal. The above-stated digital value of the converter 24 is preset by a preset datum input on the basis of the signal produced from the multivibrator circuit 31. A signal is supplied from the frequency divider 35 to the exlusive OR circuit EXOR. When the output Q1 is supplied to the exlusive OR circuit EXOR, a pulse which advances phase by 90° relative to the frequency divider 36 is produced at the exclusive OR circuit EXOR. Meanwhile, the output Q1 is supplied also to the AND circuit AND2 to cause the AND circuit AND2 to produce an H signal. The output of the OR circuit OR then becomes an H signal. The H signal from the OR circuit OR is supplied to the AND circuit AND3 and also keeps the transistor 40 in a closed state. Since the output Q2 which is another input to the AND circuit AND3 is an H signal, the AND circuit AND3 produces an H output to bring the transistor 39 into a closed state.

Accordingly, driving frequency voltages differing 90° in phase from each other are supplied to the electrostriction elements 112a and 112b to cause them to vibrate respectively. As a result, a progressive oscillation wave is produced at the diaphragm blade actuating ring 105 which is a rotatable body. The ring 105 then turns in the direction of stopping down the aperture to stop down the aperture defined by these diaphragm blades from the full-open position thereof.

Then, the turning movement of the diaphragm blade actuating ring 105 brings the switch SW into an open state. It further causes the comb switch 25a and 25b to perform a repetitive on-and-off operation. Then, a number of pulses corresponding to the rotation angle of the diaphragm blade actuating ring 105 are supplied via the chattering absorption circuit 27 to the counter 32. The counter 32 then counts down these pulses one after another down to the preset number of aperture control steps. When the result of the count becomes zero, the carry output terminal of the counter 32 produces an H signal. This causes the output of the AND circuit AND2 to become an L signal, which is then supplied to the OR circuit OR. Since at that time the inputs of other terminals of the OR circuit OR are also at L, the output level of the OR circuit OR becomes L. The output level of the AND circuit AND3 also becomes L. Therefore, both the transistors 39 and 40 come to open and the power supply comes to a stop. As a result of that, the diaphragm blade actuating ring 105 comes to a stop while the diaphragm blades 106 are stopped down to an optimum aperture. The aperture value thus controlled by the blades 106 becomes a value obtained by stopping down the diaphragm aperture from the maximum aperture value Avo to the extent of the number of aperture control steps ΔAv. This aperture value can be expressed as follows:

$$Avo + \Delta Av = Av$$

Following that, a shutter is operated to expose a film surface to light. Upon completion of the exposure, the circuit 29 is reset by an exposure control completion signal B. The output Q1 of the circuit 29 then becomes an L signal. Another output $\overline{Q1}$ of the circuit 29 becomes an H signal and is supplied to the AND circuit AND1. Since the switch SW is then in an open state, the output of the AND circuit AND1 becomes an H signal and is supplied to the OR circuit OR. This causes the output of the OR circuit OR to become H. The H output of the OR circuit OR is supplied to the AND circuit AND3 and also causes the transistor 40 to close. Since the level of the output $\overline{Q2}$ of the circuit 30 is at H, the H output together with the above-stated H cutput of the OR circuit OR causes the output level of the AND circuit AND3 to become H. The H output of the AND circuit AND3 then causes the transistor 39 also to close. As a result, power supply is effected to both of the electrostriction elements 112a and 112b. Since the output Q1 of the circuit 29 is at L, the output of the frequency divider 35 is inverted by the exclusive OR circuit EXOR. Therefore, the output of the frequency divider 35 becomes a signal the phase of which is delayed by 90° relative to the pulse produced from the other frequency divider 36. Therefore, a progressive oscillation wave produced by the vibration of the electrostriction elements 112a and 112b this time travels in the direction reverse to that of the progressive oscillation wave mentioned in the foregoing. This causes the diaphragm blade actuating ring 105 to turn in the reverse direction. Therefore, the aperture is again opened. When the aperture reaches a full-open position thereof, the switch SW is closed and an L signal is supplied to the AND circuit AND1. Then, all the inputs of the OR circuit OR become L signals to cause the OR circuit OR to produce an L output. Ihe L output of the OR circuit OR brings the transistors 39 and 40 into open states to cut off the power supply to the elements 112a and 112b and the diaphragm blades 106 stop from moving at the full-open position of the aperture.

What we claim:

1. A diaphragm device comprising:
   diaphragm blades which form an aperture;
   a first movable member arranged to actuate said diaphragm blades;
   a plurality of electrostriction element groups arranged with phase difference or polarization;
   a vibrator arranged to generate a progressive oscillation wave with voltages of different phases impressed on said plurality of electrostriction element groups;
   a second movable member arranged to be frictionally driven through pressed contact with said vibrator; and
   enhancing means arranged to enhance the motion of said second movable member and to transmit the enhanced motion to said first movable member.

2. A device according to claim 1, wherein said enhancing means includes a plurality of elastic rollers which are interposed in between said first and second movable members and are arranged around an optical axis with the optical axis located at the center of the arrangement; and a plurality of shafts which are secured to said second movable member and are arranged to rotatably carry said rollers.

3. A diaphragm device comprising:
   a plurality of electrostriction element groups arranged with phase difference or polarization;
   a vibrator arranged to generate a progressive oscillation wave with voltages of different phases impressed on said plurality of electrostriction element groups;

diaphragm blades which form an aperture;
a movable member arranged to be frictionally driven through pressed contact with said vibrator;
an urging member arranged to press said vibrator into contact with said movable member; and
power supply means for impressing voltages of different phases on said plurality of electrostriction element groups.

4. A device according to claim 3, where said urging member is arranged to serve also as electric contact for power supply.

* * * * *